United States Patent
Colombi et al.

(10) Patent No.: US 7,456,520 B2
(45) Date of Patent: Nov. 25, 2008

(54) CONTROL SYSTEM, METHOD AND PRODUCT FOR UNINTERRUPTIBLE POWER SUPPLY

(75) Inventors: Silvio Colombi, Losone (CH); Andrea Delmuè, Bellinzona (CH)

(73) Assignee: General Electric Company, Schenectady, NY (US)

( * ) Notice: Subject to any disclaimer, the term of this patent is extended or adjusted under 35 U.S.C. 154(b) by 392 days.

(21) Appl. No.: 11/096,018

(22) Filed: Mar. 31, 2005

(65) Prior Publication Data

US 2006/0221523 A1 Oct. 5, 2006

(51) Int. Cl.
*H02J 7/00* (2006.01)
*H02J 9/00* (2006.01)

(52) U.S. Cl. .............................. 307/64; 307/43; 307/66; 307/51

(58) Field of Classification Search ................. 307/64, 307/65, 66, 43, 51, 80, 85
See application file for complete search history.

(56) References Cited

U.S. PATENT DOCUMENTS

| | | | | |
|---|---|---|---|---|
| 5,612,580 | A * | 3/1997 | Janonis et al. | 307/64 |
| 6,917,124 | B2 * | 7/2005 | Shetler et al. | 307/66 |
| 6,917,271 | B2 * | 7/2005 | Zhang et al. | 336/160 |
| 2005/0063115 | A1 | 3/2005 | Nayar et al. | 361/82 |
| 2005/0073783 | A1 * | 4/2005 | Luo et al. | 361/62 |
| 2006/0164782 | A1 * | 7/2006 | Colombi et al. | 361/143 |

* cited by examiner

*Primary Examiner*—Michael J Sherry
*Assistant Examiner*—Carlos Amaya
(74) *Attorney, Agent, or Firm*—Cantor Colburn LLP

(57) ABSTRACT

A method for controlling an uninterruptible power supply (UPS) for servicing a load is disclosed. The UPS has a bypass feed path operable in parallel with an inverter feed path, the bypass feed path being engagable with the load via a first switch, and the inverter feed path and being engagable with the load via a second switch. The method includes: generating a paralleling detection signal indicative of the bypass feed path operating to service the load in parallel with the inverter feed path; and, in response to the presence of the paralleling detection signal, modifying a control signal to an inverter such as to drive toward equalization the bypass current and the inverter current. As a result, and in response to the two paths operating to service the load in parallel, the method tends to cancel circulation current generated between the bypass feed path and the inverter feed path.

17 Claims, 8 Drawing Sheets

CONTROL SYSTEM, METHOD AND PRODUCT FOR UNINTERRUPTIBLE POWER SUPPLY

BACKGROUND OF THE INVENTION

The present disclosure relates generally to uninterruptible power supplies (UPSs), and particularly to control systems for the control thereof.

UPSs are employed in a variety of applications where a constant source of power is desired at a load. A typical UPS system involves an inverter feed path, also generally referred to as the inverter, that is operably connectable in parallel with a bypass feed path, also generally referred to as the mains. The mains may be connected to a utility, but may also receive power from some other supply not connected to a utility electrical grid. The inverter may receive power from the same source as the mains, but may also receive power from some other supply.

There are basically two types of UPSs depending on their operation mode. Double conversion UPSs that offer the maximal protection level as the load is almost always fed by the inverter feed path, and line-interactive UPSs where the load is fed by the bypass feed path and the inverter is used to correct the shape of the load voltage. The double conversion type of UPS may have limited efficiency that results in higher operation costs, particularly for large units. The line-interactive type of UPS may have a better efficiency, but may not be able to maintain the quality of the output voltage when the mains frequency is variable.

The control and management of a double conversion UPS tends to keep the load on the inverter in order to maximize the protection level for the load. In some limited cases, the control has to switch the load to bypass, but as soon as possible the load is switched back on the inverter again. During these commutations, the inverter and the mains are paralleled for a short period of time, which introduces some drawbacks.

Accordingly, there is a need in the art for a control strategy allowing for the control of the paralleling between mains and inverter of a UPS system.

BRIEF DESCRIPTION OF THE INVENTION

An embodiment of the invention includes a method for controlling an uninterruptible power supply (UPS) for servicing a load, the UPS having a bypass feed path operable in parallel with an inverter feed path, the bypass feed path being engagable via a first switch to deliver a bypass current to the load, and the inverter feed path having an inverter responsive to a control signal and being engagable via a second switch to deliver an inverter current to the load. The method includes: generating a paralleling detection signal indicative of the bypass feed path operating to service the load in parallel with the inverter feed path; and, in response to the presence of the paralleling detection signal, modifying the control signal to the inverter such as to drive toward equalization the bypass current and the inverter current. As a result, and in response to the two paths operating to service the load in parallel, the method tends to cancel circulation current generated between the bypass feed path and the inverter feed path.

Another embodiment of the invention includes a control system for an uninterruptible power supply (UPS) for servicing a load, the UPS having a bypass feed path operable in parallel with an inverter feed path, the bypass feed path being engagable via a first switch to deliver a bypass current to the load, and the inverter feed path having an inverter responsive to a control signal and being engagable via a second switch to deliver an inverter current to the load. The control system includes a processing circuit and a storage medium, readable by the processing circuit, storing instructions for execution by the processing circuit for practicing an embodiment of the aforementioned method.

A further embodiment of the invention includes a control system for an uninterruptible power supply (UPS) for servicing a load, the UPS having a bypass feed path operable in parallel with an inverter feed path, the bypass feed path being engagable via a first switch to deliver a bypass current to the load, and the inverter feed path having an inverter responsive to a control signal and being engagable via a second switch to deliver an inverter current to the load. The control system configured for facilitating actions for practicing an embodiment of the aforementioned method.

Yet another embodiment of the invention includes a computer program product for controlling an uninterruptible power supply (UPS) for servicing a load, the UPS having a bypass feed path operable in parallel with an inverter feed path, the bypass feed path being engagable via a first switch to deliver a bypass current to the load, and the inverter feed path having an inverter responsive to a control signal and being engagable via a second switch to deliver an inverter current to the load. The computer program product has machine readable instructions embodied in a tangible medium for practicing an embodiment of the aforementioned method.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a control system for an uninterruptible power supply (UPS) that services a load. The UPS system has a bypass feed path operable in parallel with an inverter feed path, where the bypass feed path is engagable via a first switch to deliver a bypass current to the load, and the inverter feed path is engagable via a second switch to deliver an inverter current to the load. The inverter feed path has an inverter responsive to a control signal for controlling the output voltage of the inverter. The control system is configured to generate a paralleling detection signal indicative of the bypass feed path operating to service the load in parallel with the inverter feed path. In response to the presence of the paralleling detection signal, the control system modifies the control signal to the inverter such as to drive toward equalization the bypass current and the inverter current, thereby tending to cancel circulation current generated between the bypass feed path and the inverter feed path in response to the two paths operating to service the load in parallel.

Figure 1:
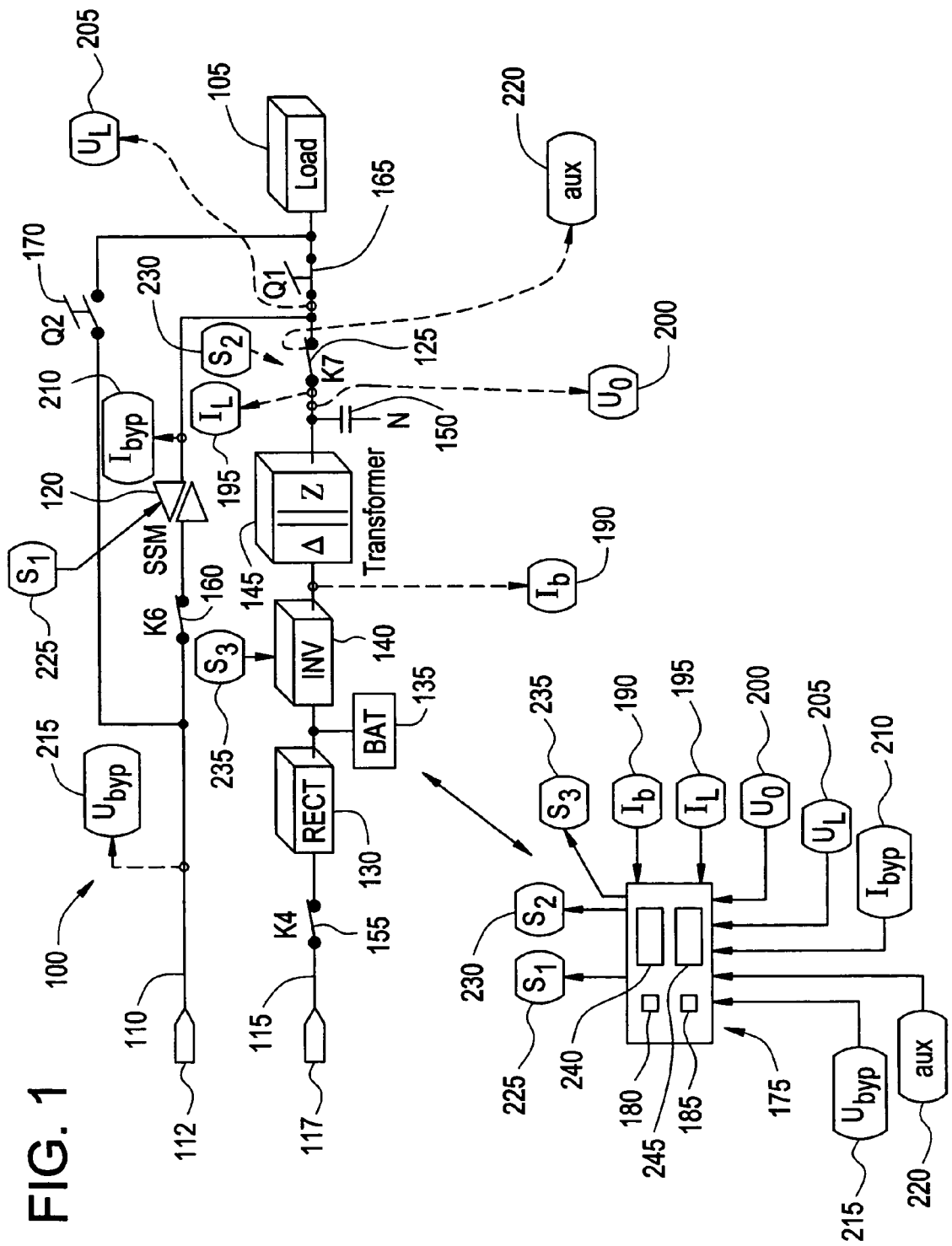
FIG. 1 depicts in one-line diagram form an exemplary UPS system in accordance with an embodiment of the invention.

FIG. 1 is an exemplary embodiment of an uninterruptible power supply (UPS) system 100 for servicing a load 105. The UPS 100 includes a bypass feed path 110 and an inverter feed path 115 that are operable in parallel with each other during the transfer of power from one path to the other. The power source 112 for the bypass feed path 110 may be a utility or other main power source. The power source 117 for the inverter feed path 115 may be the same as that of the bypass feed path 110, or it may be a different power source. The bypass feed path 110 is engagable with the load 105 via a first switch 120 to deliver a bypass current to the load 105, and the inverter feed path 115 is engagable with the load 105 via a second switch 125 to deliver an inverter current to the load 105. In an embodiment, the first switch 120 is a remote controllable static switch module (SSM) of a type known to one skilled in the art, and the second switch 125 is a remote controllable contactor of a type known to one skilled in the art. The inverter feed path 115 includes a rectifier 130, a battery 135, an inverter 140, a transformer 145, and filtering capacitors 150. Disconnect switches (K4) 155, (K6) 160, (Q1) 165 and (Q2) 170 may be employed for additional protection and/or control and/or maintenance. In an embodiment, switches (K4) 155 and (K6) 160 are circuit breakers, and switches (Q1) 165 and (Q2) 170 are manual disconnects.

While FIG. 1 depicts a UPS 100 in one-line diagram form, it will be appreciated that UPS 100 may have multiple phases, such as three phases for example, and that any reference herein to a current or a voltage in one phase is intended to be a reference to the current and voltage of each phase.

In an embodiment, a control system 175 includes a processing circuit 180 and a storage medium 185, readable by the processing circuit 180, storing instructions for execution by the processing circuit for controlling the UPS 100 in a manner to be described in more detail below.

In an embodiment, input signals to control system 175 include inverter bridge currents (Ib) 190, inverter load currents (IL) 195, inverter output voltages (Uo) 200, load voltages (UL) 205, bypass load currents (Ibyp) 210, and bypass output voltages (Ubyp) 215, that are generated by any sensor suitable for the intended purpose. Another input signal to control system 175 is (aux) 220 that is provided by an auxiliary contact (not specifically shown but represented also by reference numeral 220) at second switch (K7) 125 and identifies the on/off state of the main contacts of second switch 125.

While reference is made to bypass feed path 110 and inverter feed path 115, it will be appreciated by those skilled in the art that the inverter load currents IL 195 are not the same as those currents flowing through contactor K4 155.

In an embodiment, output signals from control system 175 include a command signal (S1) 225 to first switch 120, a command signal (S2) 230 to second switch 125, and a command signal (S3) 235 to inverter 140.

In one embodiment, output signals 225, 230 and 235 may originate from control system 175. However, in another embodiment, output signals 225, 230 and 235 may be analog and may originate from another source (not shown) and be monitored and used by control system 175.

In an embodiment, the following logic is employed:
S1=(1, 0): SSM command signal (ON, OFF), respectively;
S2=(1, 0): K7 command signal (ON, OFF), respectively; and
S3=(1, 0): Inverter command signal (ON, OFF), respectively.

Figure 2:
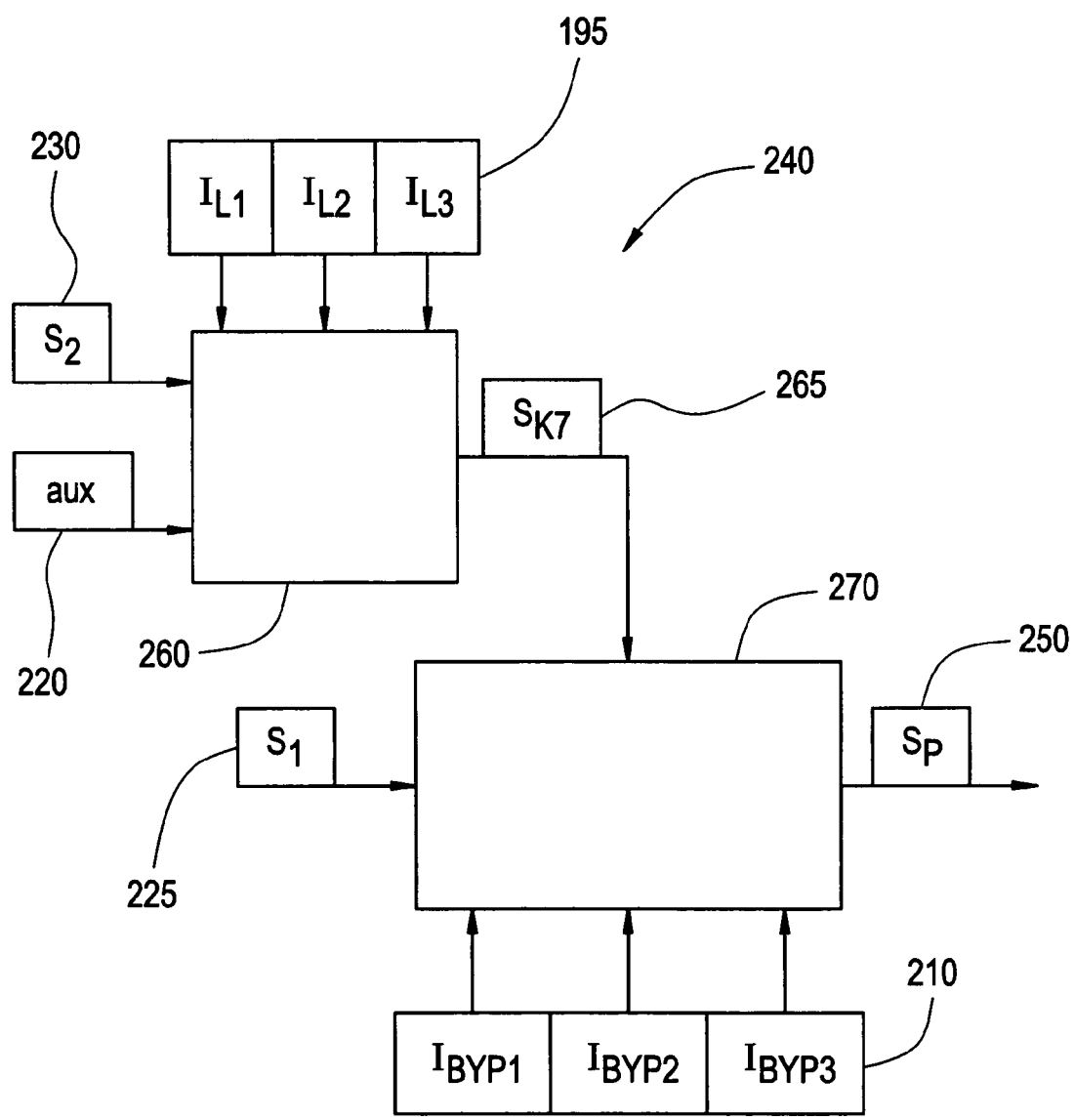
FIG. 2 depicts in logic block form an exemplary portion of a control system in accordance with an embodiment of the invention.
Figure 3:
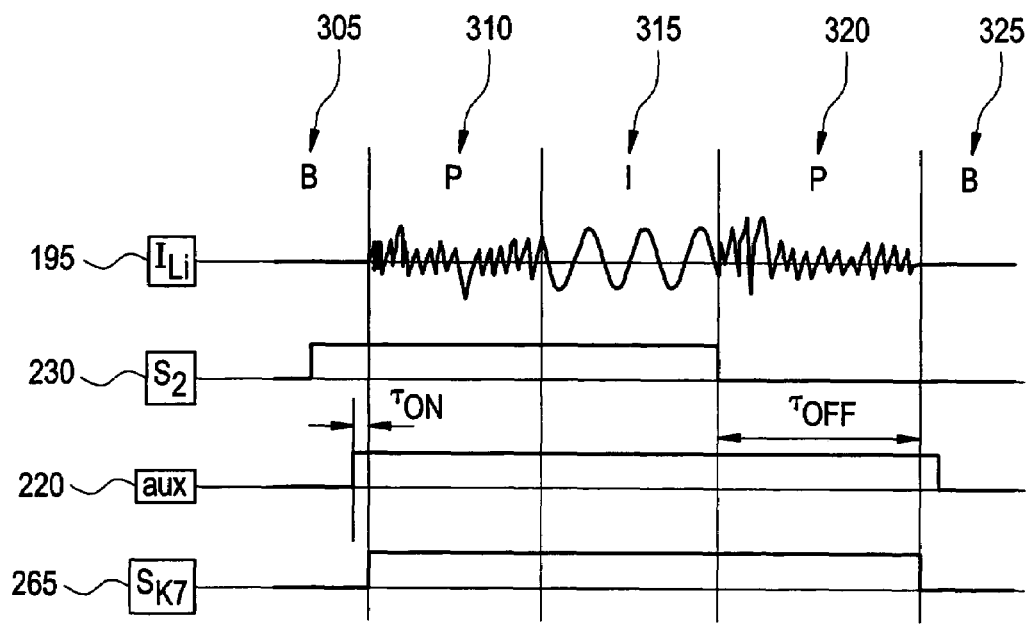
FIGS. 3-5 depict exemplary event signals in accordance with an embodiment of the invention.

Referring now to FIGS. 2 and 3, control system 175 also includes a paralleling detection signal generator (PDSG) 240 and an inverter output voltage controller (IOVC) 245, which are each represented in logic block diagram form. The PDSG 240 is responsible for generating a paralleling detection signal Sp 250 indicative of the bypass feed path 110 operating to service the load 105 in parallel with the inverter feed path 115. The IOVC 245 is responsible for generating a control voltage Um 255 for controlling the output voltage Uo 200 of the filtering capacitors 150.

With reference now to FIG. 2 (C1, see complement), PDSG 240 includes a first logic block 260 that receives logical signals (1 or 0) from S2 230 and aux 220, and current signals from currents IL 195 (where the three phase currents are represented by numerals 1, 2 and 3), and is productive of a logical signal SK7 265, which has logical value "1" only when second switch 125 is effectively closed in power.

Figure 4:
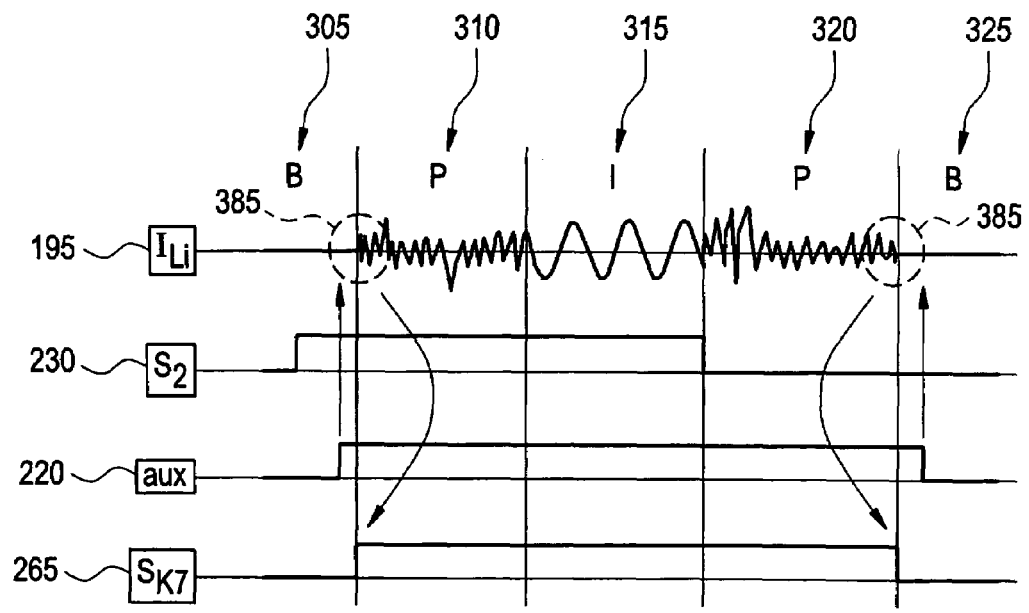

The implementation of logic block 260 may be accomplished in two exemplary ways, which are represented by FIGS. 3 and 4. In general, FIGS. 3 and 4 illustrate the state of several signals as UPS 100 transfers from bypass (B) 305 to parallel (P) 310, to inverter (I) 315, to parallel (P) 320, then back to bypass (B) 325.

In a first implementation depicted in FIG. 3, two programmed delays $\tau_{ON}$ and $\tau_{OFF}$ are used to determine the logical signal $S_{K7}$. With this implementation, it is not possible to compensate for variations in the opening/closing times of the contactor (normal spread or aging for example). As seen in FIG. 3, time delay $\tau_{ON}$ controls the delay between the aux signal 220 and the SK7 signal 265 in response to K7 125 closing, and time delay $\tau_{OFF}$ controls the delay between the command signal S2 230 and the SK7 signal 265 in response to K7 125 opening.

In a second implementation depicted in FIG. 4, a simple "zero detector" (depicted generally by reference numeral 385) is used to determine when the inverter load currents IL 195 are zero. In the second implementation, the aux signal 220 is used to enable/disable the "zero detector" 385.

Accordingly, logical signal SK7 265 is a signal representative of the second switch 125 being OFF, and is generated from the signal S2 230 that commands the second switch 125 to turn OFF and the signal aux 220 that confirms that the second switch 125 is OFF.

PDSG 240 also includes a second logic block 270 that receives logical signals from SK7 265, S1 225, and Ibyp 210, and is productive of the logical signal Sp 250. In FIG. 2, three signal lines are illustrated for Ibyp 210 as being representative of a three phase UPS 100.

Logical signal Sp 250 is determined by the logical equation $$(Sp)=(SK7) \text{ AND } (S1 \text{ OR } (\text{NOT}(Szd)))  \quad \text{Equation 1}$$

where Szd (Signal Zero Detect) has a logical "1" when the bypass load currents Ibyp 210 are zero. The logic signal Szd is determined using a simple "zero detector" 385 as in the case described above in reference to FIG. 4. This "zero detector" 385 is used to account for the difference between the command signal S1 225 and the effective opening of the SSM 120 that happens, for every phase, when the respective current crosses zero. This phenomenon is visible in FIG. 5. After the command signal S1 225 is toggled from 1 to 0 (depicted by reference numeral 345), a delay occurs prior to the effective switching off of the SSM 120 where the current through the bypass line is zero (Ibyp 210 is zero), which is depicted in the region represented by reference numeral 315.

Figure 5:
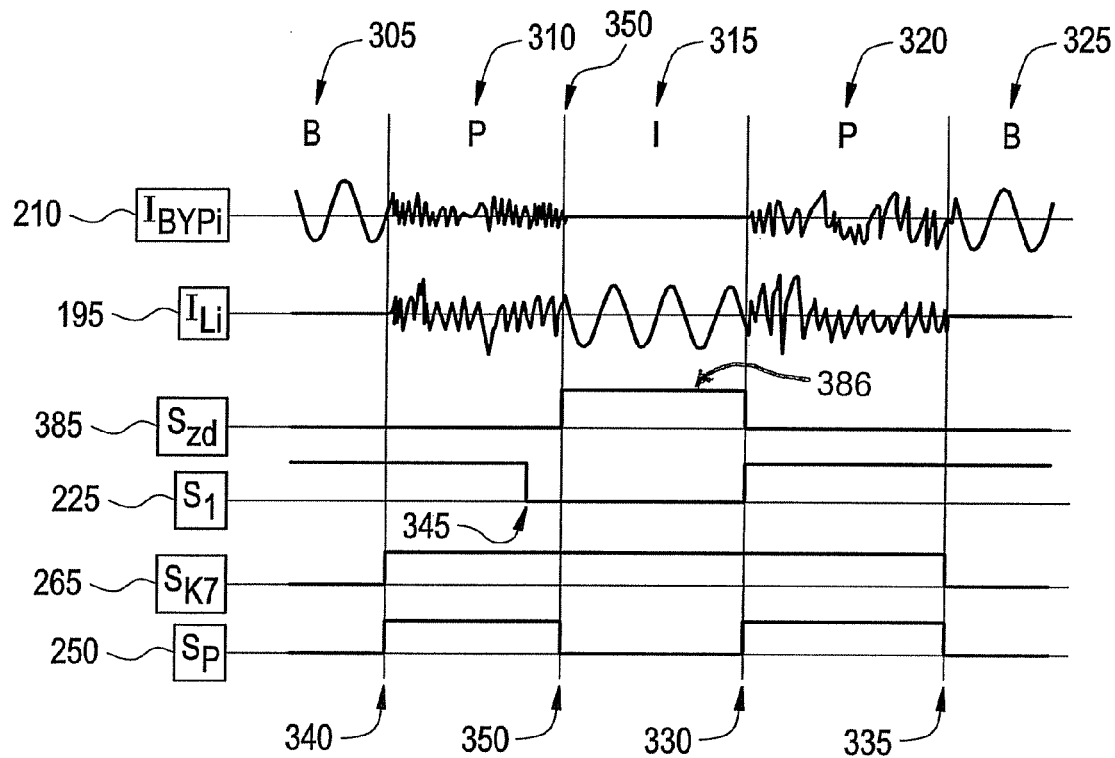

As a result of the signal sequence depicted in FIG. 5, which will be discussed in more detail below, the logical value of Sp 250 is provided to IOVC 245, which will now be discussed with reference to FIG. 6.

Figure 6:
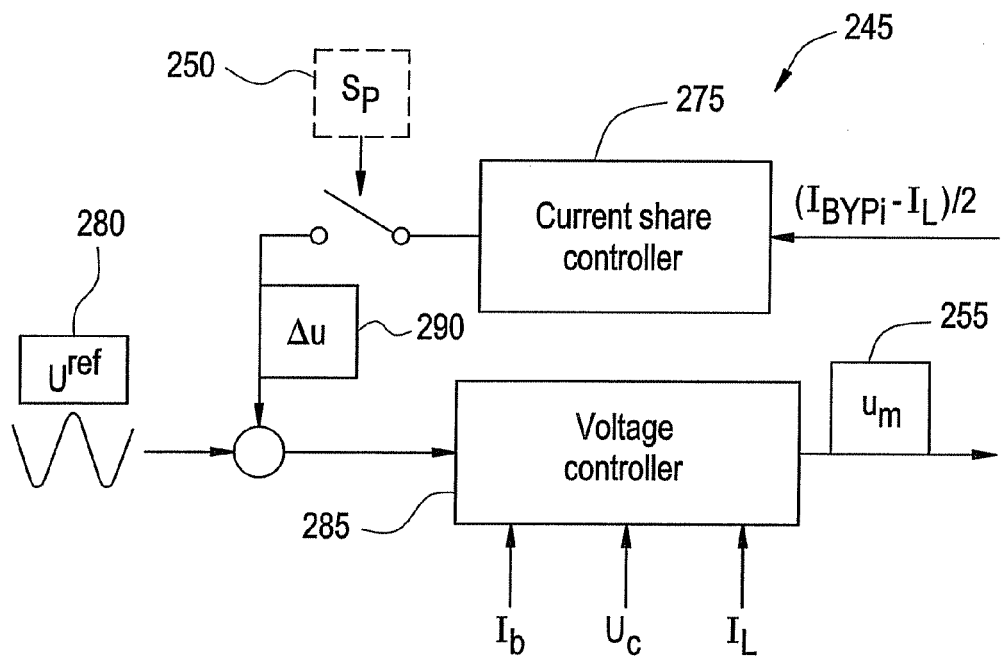
FIG. 6 depicts in logic block form another exemplary portion of a control system in accordance with an embodiment of the invention.

In FIG. 6, IOVC 245 includes a current share controller 275 that receives signals representative of the load currents from the bypass feed path 110 and the inverter feed path 115. These signals may be representative of the actual load currents, such as Ibyp 210 and IL 195. In response to Sp 250 being "1" (that is, Sp switch depicted in FIG. 6 being ON), the reference voltage Uref 280 (variable with time), which is a model value at control system 175 of the desired filtering capacitor voltage Uo 200, is modified via ΔU 290 in phase and amplitude by the current share controller 275 in order to make the inverter and bypass currents equal. The voltage controller 285 receives as input reference voltage Uref 280, voltage modification ΔU 290 from current share controller 275, inverter bridge currents Ib 190, inverter output voltages Uo 200, and inverter load currents IL 195, and is productive of the voltage control signal Um 255.

To reduce the circulation current (Icirc) between the bypass feed path 110 and the inverter feed path 115, the value of Icirc needs to be driven to zero or canceled, thereby driving toward equalization the bypass current and the inverter current in response to the presence of the paralleling detection signal Sp 250. The value of Icirc may be represented by:

$$Icirc = Iref - IL = (Ibyp + IL)/2 - IL = (Ibyp - IL)/2,\quad \text{Equation-2}$$

where Iref represents the desired 50% load current in the inverter feed path 115, that is, Iref is 50% of (Ibyp+IL). As seen by reference to FIG. 6, Equation-2 is employed by current share controller 275.

As will be recognized, FIG. 1 depicts a schematic of a typical double conversion UPS system 100 with output transformer 145 for providing a galvanic isolation. In addition, the leakage inductance of the transformer 145 and the output capacitors 150 are used to filter the inverter voltage.

During normal operation, the rectifier 130 converts the input power source 117 to regulated DC to charge the battery 135 as well as supply the inverter 140. The inverter 140 converts the DC to a voltage & frequency regulated AC output at all times. During "stored energy" mode, that is, during a power outage at source 117, the inverter 140 draws power from the energy storage (battery) 135 and continues to supply the output. Alternatively, bypass operation is possible through the first switch (SSM) 120.

FIG. 1 depicts UPS 100 having a series of disconnect devices, where manual switches are designated by the letter (Q) and circuit breakers or contactors are designated by the letter (K). In an embodiment, K4 155 may be used for an automatic startup, but K4 may be replaced by a Q4 for a manual rectifier startup. Switch Q2 170 is used for manual bypass, switch Q1 165 is used for output disconnect, switch K6 160 is used for SSM short-circuit protection, and switch K7 125 is used for inverter output disconnect. The transitions from bypass to inverter and from inverter to bypass are controlled through the first switch (SSM) 120 and the second switch (K7) 125. Normal operation of UPS 100 involves the delivery of power to the load 105 via the inverter feed path 115, and the bypass operation of UPS 100 involves the delivery of power to the load 105 via the bypass feed path 110.

The control and management of a double conversion UPS 100 tends to keep the load 105 on inverter feed path 115 in order to maximize the protection level for the load 105. However, in some cases, the control system 175 needs to switch the load 105 to the bypass feed path 110, but as soon as possible the load 105 is switched back to the inverter 140 again. Bypass operation may be desirable in specific cases for single and parallel operation, such as overload conditions, output voltage shape being out of tolerance, and inverter downtime, for example.

At each commutation (inverter)↔(bypass), the inverter feed path 115 and the bypass feed path 110 are paralleled for a short time while feeding the load 105, which as discussed previously, may generate an uncontrolled circulation current between the inverter feed path 115 and bypass feed path 110, and may cause energy to be transferred from the utility power source 112 to the DC link (rectifier 130, battery 135 and inverter 140), thereby potentially increasing the DC link voltage. This problem may get worse as the voltage difference between bypass feed path 110 and inverter feed path 115 increases, or when the commutations (inverter)↔(bypass) are carried out in maximal load conditions and without batteries. As one skilled in the art will appreciate, the latter case provides inertia and damps the voltage oscillations of the DC link. Commutations without batteries may occur in the situation of a battery exhaustion or misconnection, but may also occur when an alternative energy source is used, such as a flywheel (not shown) for example. In an extreme situation (no battery, high voltage difference, maximal load), the DC link voltage may increase above a maximal allowed value causing a stop operation or even damage to the inverter 140 or the rectifier 130.

Due to the finite commutation time of the first switch (SSM) 120 and second switch (K7) 125, arising from the inertia associated with the movement of mechanical parts of K7 125, the time of paralleling between the two feed paths 110, 115 cannot be reduced below a minimal value. This value may range from about 10 to about 80 ms (milliseconds), depending on the power level. The bigger the second switch (contactor K7 for example), the slower the opening/closing time. The time for an inverter-to-bypass transition is of more concern, as it needs to happen as soon as possible in order to timely respond to an external unknown event. On the other hand, a transition from bypass-to-inverter is not so time sensitive. Typically, and prior to triggering a bypass-to-inverter transition, the inverter voltage is adapted to the bypass voltage in order to minimize the circulation current. Accordingly, the use of a paralleling detection signal Sp 250, in accordance with the disclosure herein, provides control system 175 with a means for controlling the parallel operation between the inverter feed path 115 and the bypass feed path 110, thereby providing soft bypass transfers that serve to increase system reliability.

Where the power source 112 of the bypass feed path 110 is a utility, the voltage of the source cannot be influenced. However, the output voltage of the inverter 140 may be varied in amplitude and phase in order to cancel the circulation currents between bypass feed path 110 and the inverter feed path 115. Control system 175 uses paralleling detection signal Sp 250 in the manner disclosed herein to control the output voltage of inverter 140 to drive toward equalization the bypass current and the inverter current, thereby tending to cancel circulation current generated between the bypass feed path 110 and the inverter feed path 115 in response to the two paths operating to service the load in parallel.

To effect cancellation of the circulation current, control system 175 receives input signals that detect the transition between the various operating states, that is, [BYPASS], [INVERTER] and [PARALLEL], and provides output signals to control the UPS 100 accordingly. In the state [PARALLEL], control system 175 commands the inverter 140 via load share algorithms to cancel the circulation current between the bypass feed path 110 and the inverter feed path 115. In an embodiment, the control logic is implemented in a two phase rotating reference frame, and a state space phase control keeps the inverter reference voltage vector in phase with the bypass voltage vector. The current share controller 275 modifies the phase and amplitude of the inverter reference vector in order to cancel the circulation currents between bypass and inverter.

The operation of control system 175 will now be discussed with reference back to FIG. 5, which as previously mentioned depicts the state of several signals as UPS 100 transfers from bypass (B) 305 to parallel (P) 310, to inverter (I) 315, to parallel (P) 320, then back to bypass (B) 325. The several signals depicted are: current signal Ibyp 210 (current in bypass feed path 110); current signal IL 195 (current in inverter feed path 115); logic zero detect signal Szd 386 from zero detector 385 (logical "1" represents zero current in bypass feed path 110, that is, Szd 386 is logical "1" in response to Ibyp 210 being zero); logic signal S1 225 (command signal to turn first switch 120 ON/OFF); logic signal SK7 265 (logic signal from logic block 260 representative of second switch 125 being ON/OFF); and, logic signal Sp 250 (logic signal from PDSG 240 to IOVC 245 representative of current flow in both bypass feed path 110 and inverter feed path 115).

Still referring to FIG. 5, reference will first be made to the transfer action from inverter (I) 315 to bypass (B) 325 via parallel (P) 320, which begins with first switch 120 being OFF (S1 225 having logical value "0"), second switch 125 being ON (SK7 265 having logical value "1"), paralleling detection signal Sp 250 having logical value "0", no current present in the bypass feed path 110 (Ibyp 210 zero), and current present in the inverter feed path 115 (IL 195 different from zero). As will be recognized by reference to FIGS. 3-5, Ibyp 210 and IL 195 are current signals and not logic signals, while the zero detect signal Szd 386 from zero detector 385 is a logic signal.

At event 330, control system 175 receives information that first switch 120 is signaled to turn ON (S1 225 changes to logical "1"), resulting in parallel current flow and paralleling detection signal Sp 250 changing to logical "1" (see Equation-2). As can be seen, in response to first switch 120 being ON and second switch 125 being signaled to turn OFF, but prior to second switch 125 actually being OFF, the paralleling detection signal Sp 250 is generated.

At event 335, control system 175 receives information that second switch 125 is signaled to turn OFF, which is the desired transfer action by control system 175 changing command signal S2 230 to logical "0", thereby causing SK7 265 to go to logical "0" (see FIGS. 3 and 4), which in turn provides control system 175 with a signal representative of the second switch 125 being OFF. As a result of SK7 265 going to logical value "0", logical block 270 (implementing Equation-2) changes Sp 250 to logical "0". In response to the paralleling detection signal Sp 250 being OFF, control system 175 via IOVC 245 disassociates the control signal Um 255 to the inverter with respect to the modification ΔU 290 that serves to drive toward equalization the bypass current and the inverter current when Sp 250 is "1".

Referring now to the transfer action from bypass (B) 305 to inverter (I) 315 via parallel (P) 310, which begins with first switch 120 being ON (S1 225 having logical value "1"), second switch 125 being OFF (SK7 265 having logical value "0"), paralleling detection signal Sp 250 having logical value "0", no current present in the inverter feed path 115 (IL 195 zero), and current present in the bypass feed path 110 (Ibyp 210 different from zero).

At event 340, control system 175 receives information that second switch 125 is signaled to turn ON via command signal S2 230 going to logical "1" and is then confirmed to be ON via aux signal 220 going to logical "1", which causes SK7 265 to change to logical "1" via logic block 260 and FIGS. 3 and 4. Also at event 340, and as a result of S1 225 being "1", SK7 265 being "1", and current flowing in the bypass feed path 110 (Ibyp being different from zero), the paralleling detection signal Sp 250 is generated by changing to logical "1" (via logic block 270 and Equation-1).

At event 345, control system 175 receives information that first switch 120 is signaled to turn OFF (S1 225 changes to logical "0"). However, with SK7 265 being at logical "1" and Ibyp 210 indicating active current flow (see Ibyp signal during paralleling period P 310 in FIG. 5), logical block 270 and Equation-2 do not allow paralleling detection signal Sp 250 to change to logical "0" until event 350, which is the point in time when the last SSM (first switch) 225 of all three in a three phase system becomes non-conductive, due to the different times for current-zero in the three-phase system.

Thus, at event 350, control system 175 receives information that the first switch 120 is OFF (S1 225 is at logical "0"), and that the bypass current is OFF (Ibyp 210 is zero and Szd 386 goes to logical "1"), thereby resulting in paralleling detection signal Sp 250 turning OFF (changing to logical "0") via logical block 270 and Equation-2. In response to the paralleling detection signal Sp 250 being OFF, control system 175 via IOVC 245 disassociates the control signal Um 255 to the inverter with respect to the modification ΔU 290 that serves to drive toward equalization the bypass current and the inverter current when Sp 250 is "1".

From the above discussion, it will be appreciated that IOVC 245 is responsive to the voltage difference ΔU 290 between the output of the bypass feed path 110 and the output of the inverter feed path 115 only in the presence of the paralleling detection signal Sp 250 having the logical value "1".

Empirical data from an uncontrolled 160 kVA (kilo-Volt-Ampere) UPS 100, that is, in the absence of the control system 175 disclosed herein, shows that the bypass and inverter currents during a transfer (feed paths in parallel) from inverter to bypass results in substantially different current amplitudes in the two feed paths, thereby indicating the presence of undesirable circulation current between the bypass and inverter feed paths.

Figure 7:
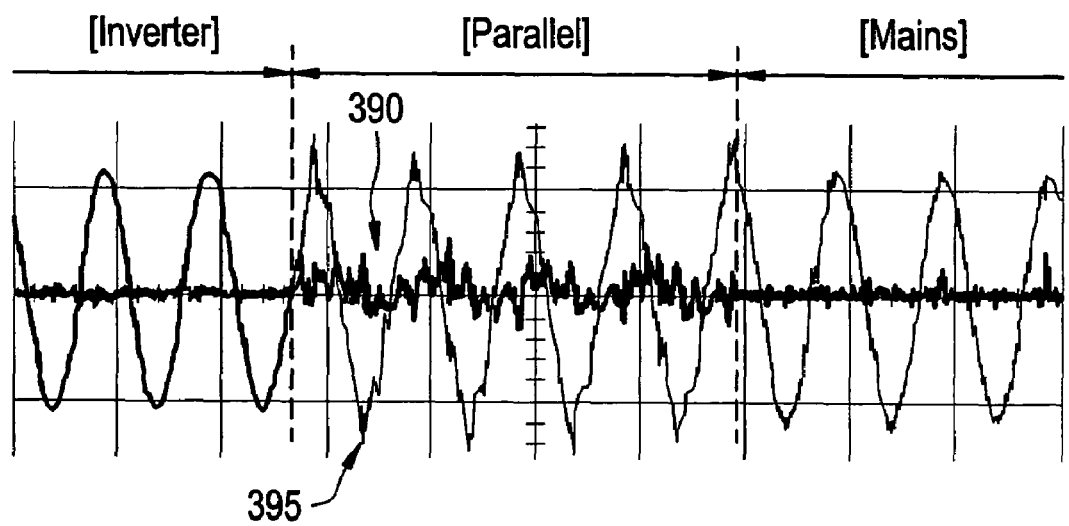
FIGS. 7 and 8 illustrate empirical current data in the absence of and in accordance with an embodiment of the invention, respectively.
Figure 8:
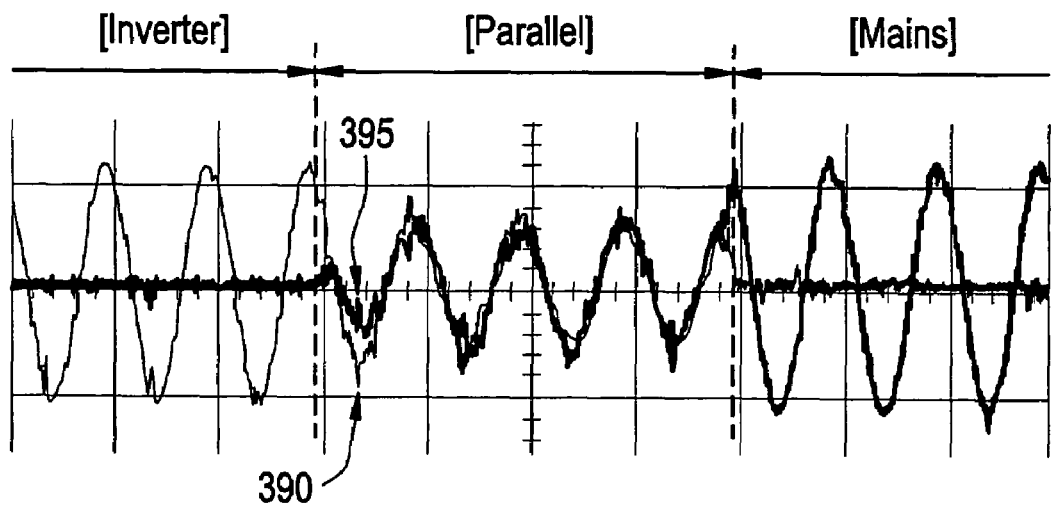

Conversely, empirical data from a controlled 160 kVA UPS 100, that is, in the presence of the control system 175 disclosed herein, shows that the bypass (mains) and inverter currents during a transfer from inverter to bypass (mains) results in substantially the same current amplitudes in the two feed paths, thereby indicating the absence of undesirable circulation current between the bypass and inverter feed paths. This result may be seen with reference to FIGS. 7 and 8, which illustrate empirical current data for a transfer event from "inverter" to "mains", with "parallel" current flow occurring during the transfer. In FIGS. 7 and 8 during a parallel event, inverter current is represented by reference numeral 390, and mains current is represented by reference numeral 395. As can be seen, FIG. 7 illustrates grossly unequal inverter and mains current flow that occurs during a parallel event in the absence of an embodiment of the invention, and FIG. 8 illustrates substantially equal inverter and mains current flow that occurs during a parallel event in the presence of an embodiment of the invention.

Figure 9:
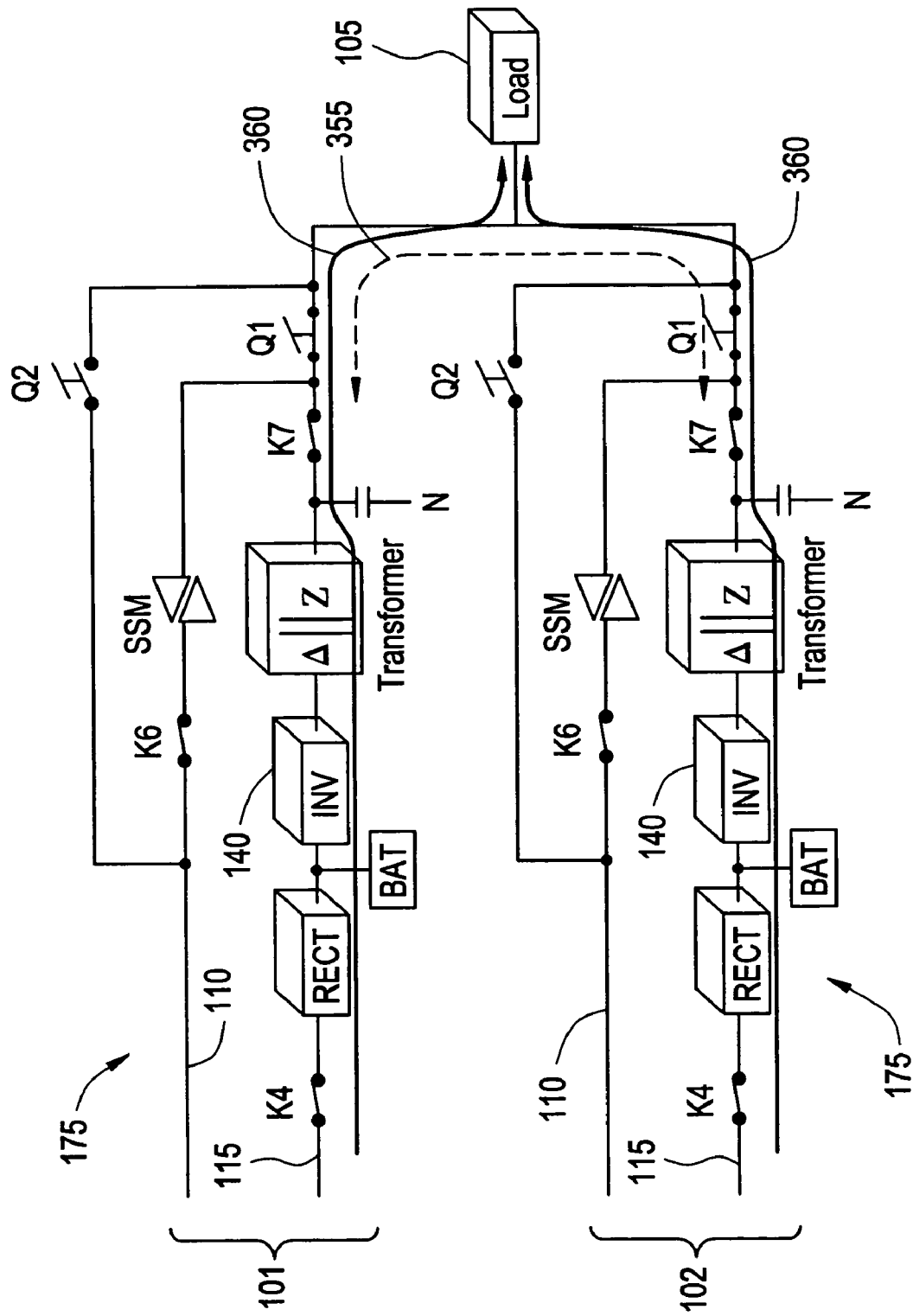
FIGS. 9-11 depict in one-line diagram form and in accordance with an embodiment of the invention UPS systems having alternative configurations/operation modes to that of FIG. 1.

FIG. 1 depicts a single UPS 100, however, when more UPSs 100 are used in parallel, the situation is more complex. FIG. 9 shows two paralleled UPSs 101, 102, each being similar to UPS 100 in FIG. 1, but in an RPA (redundant parallel architecture) configuration. In this case, the control system 175 of each UPS 101, 102 commands its inverter 140 in order to cancel the circulation current, depicted generally by reference numeral 355 and represented by the dotted arrowhead line in FIG. 9. This way, the two inverter feed paths 115 share the load 105 at 50%, which is depicted by reference numeral 360 and represented by the solid arrowhead line in FIG. 9. To realize this, the control system 175 of every UPS 101, 102 includes a load share algorithm, as discussed previously, implemented in a two phase rotating reference frame.

In the case of an RPA configuration, when the load has to be switched to bypass, it is not possible for an inverter to share the load with the other inverter while at the same time sharing the load with the bypass feed path. However, some other strategies may be applied. Here, the basic idea is to change the objective of the load share algorithm (implemented via control system 175) of each UPS 101, 102 as a function of the operating state, that is, [BYPASS], [INVERTER] and [PARALLEL]. In the state [BYPASS], the load share algorithm is not active. In the state [INVERTER], the load share algorithm has to cancel the circulation current between the various inverters in parallel (see FIG. 9). In the state [PARALLEL] various strategies are possible.

Figure 10:
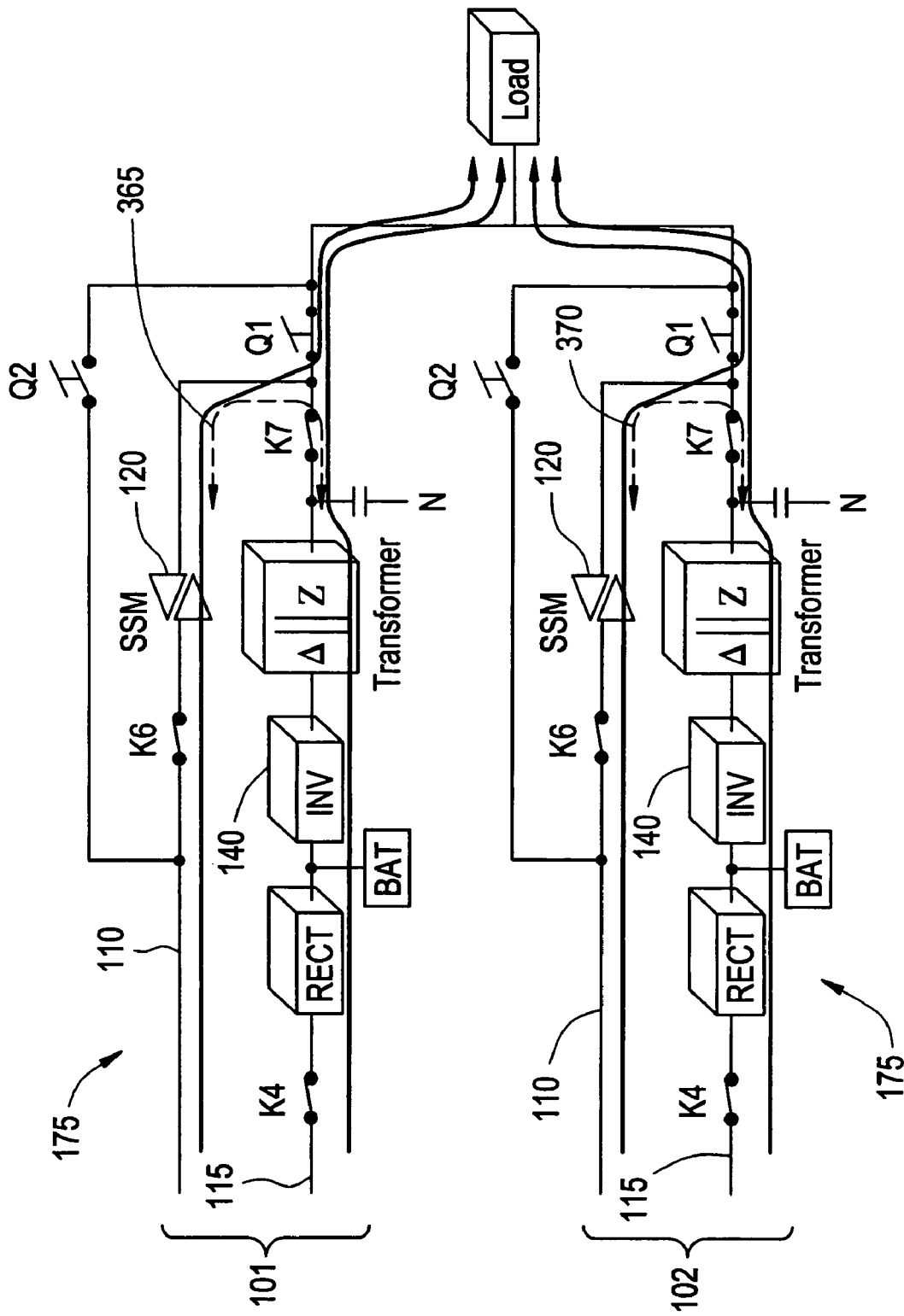

With a first strategy (in the state [PARALLEL]), depicted in FIG. 10, the load share algorithm of each UPS 101, 102 works to cancel the circulation current between its inverter and its bypass, depicted by reference numerals 365 and 370. This automatically ensures no circulation current between the various inverters, assuming that the impedance of the two bypass lines ($Z_{byp1}$ and $Z_{byp2}$) are proportional, that is, $$Z_{byp1}/Z_{byp2} = \eta.$$  Equation-3

Equation-3 is satisfied with $\eta=1$ when the two bypass lines have the same length. If the bypass lines are wired with the same cable but have a different length, Equation-3 will not be satisfied due to the different nature of the impedance of the bypass cable and of the SSM (first switch) 120. However, in practice, when installing an RPA system, the cables of the various bypass lines are typically sized to have a very similar length, typically within 10% of each other. This is desirable to ensure a good current distribution between the various SSMs 120 when the system is operating in bypass. As a consequence, Equation-4 is satisfied in typical cases.

Figure 11:
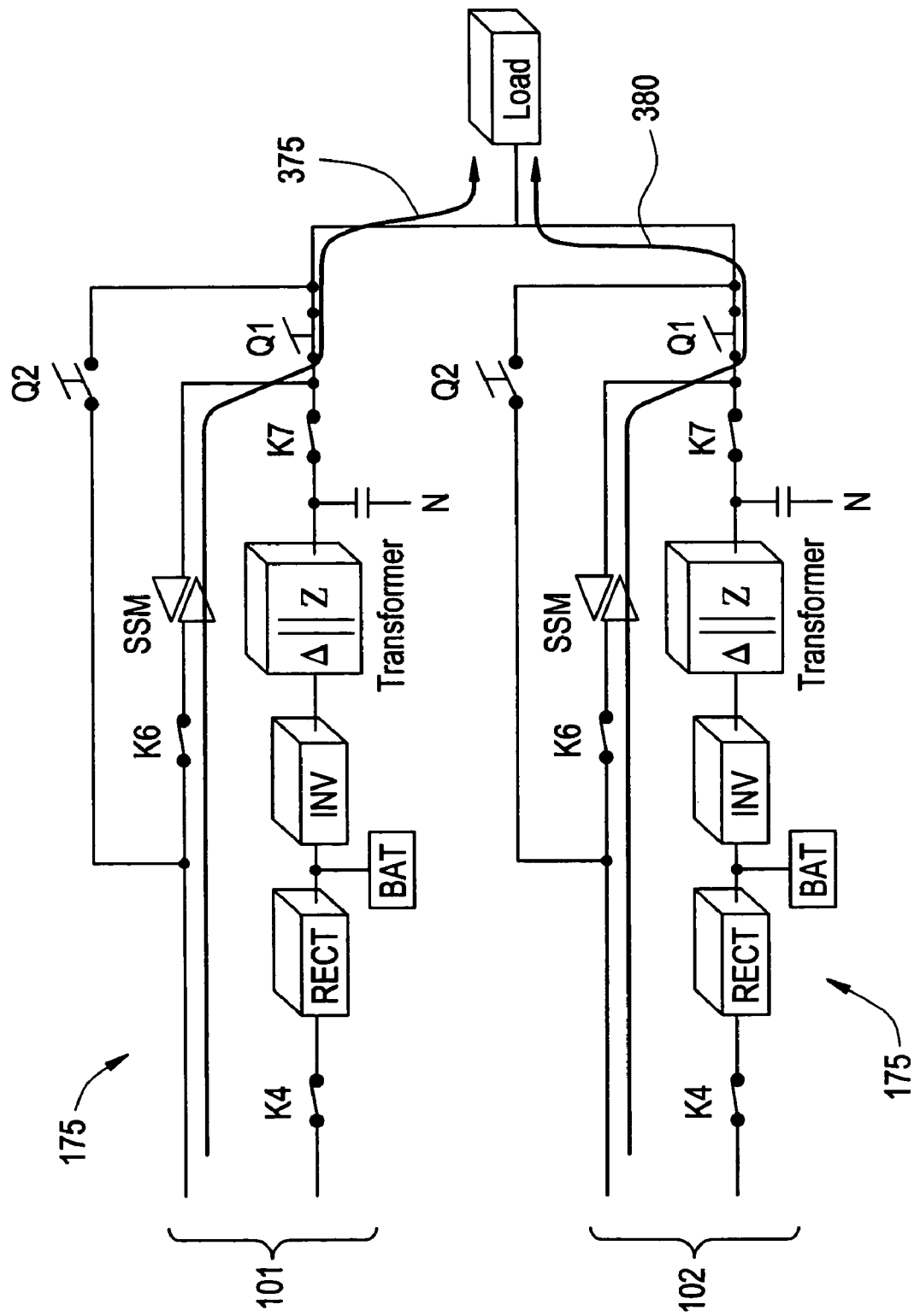

With the RPA system in bypass, that is, once the transfer from inverter to bypass is completed for example, the load share may be represented as depicted in FIG. 11. If Equation-3 is satisfied, the two bypass currents $I_{byp1}$ 375 and $I_{byp2}$ 380 satisfy the equation:

$$I_{byp1}/I_{byp2} = 1/\eta,$$  Equation-4 that is, the bypass currents are in phase and their amplitude is in inverse ratio of the bypass impedances. Consider now a transition from inverter to bypass with the strategy described above. During the parallel operation between bypass and inverter, we have $$I_{inv1} + I_{inv2} + I_{byp1} + I_{byp2} = I_{load}$$  Equation-5 where the two inverter currents are represented by $I_{inv1}$ and $I_{inv2}$. As the load share of each UPS 101, 102 works to cancel the circulation current between its inverter and its bypass (see FIG. 10), we also have $$I_{inv1}/I_{inv2} = 1/\eta.$$  Equation-6

Thus, $$I_{inv2} + I_{byp2} = \eta(I_{inv1} + I_{byp1}).$$  Equation-7

During the bypass transfer, the global current (bypass plus inverter) delivered by each UPS 101, 102 is shared in the same proportion as the bypass currents under a pure bypass operation. Assuming Equation-3 is satisfied, there are no circulation currents inside the units (between inverter and bypass) as well as between the units (between inverters). The aforementioned strategy has the advantage that no additional information has to be exchanged between the units to manage the bypass transfer phase.

Using a second strategy, it is possible to automatically deal with the case of unavailable SSMs 120. As before, in the state [BYPASS] the load share algorithm is not active. The difference here is that in the states [INVERTER] and [PARALLEL], the load share algorithm has to cancel the total UPS current (bypass plus inverter). This way, if one SSM 120 is out of order, the corresponding inverter has to deliver more current. This strategy requires some modifications to the control system, but basically the UPSs 101, 102 have to exchange the total currents instead of the inverter currents.

Other similar strategies may be implemented for an RPA topology, especially if the UPSs 101, 102 exchange more information on the communication link, that is, the inverter currents and the bypass currents.

Also, the proposed soft bypass transfer may be applied not only to RPA systems, but also to UPS systems with a centralized bypass.

An embodiment of the invention may be embodied in the form of computer-implemented processes and apparatuses for practicing those processes. The present invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. The technical effect of the executable instructions is to control the inverter output voltage so as to drive toward equalization the bypass current and the inverter current, thereby tending to cancel circulation current generated between the bypass feed path and the inverter feed path in response to the two paths operating to service the load in parallel. As a result, an embodiment of the invention may be implemented in a digital system. However, and as previously discussed, embodiments of the invention are not limited to digital systems only and may also be implemented in an analog system.

In view of the foregoing, some embodiments of the invention may have some of the following advantages: a UPS control system and strategy that is adaptable to installed UPS systems by the implementation of control software only; a UPS control system for driving toward equalization the bypass current and the inverter current, thereby tending to cancel circulation current generated between the bypass feed path and the inverter feed path in response to the two paths operating to service the load in parallel; a UPS control strategy that works for single and parallel units and allows soft bypass transfers resulting in an increase in reliability of the UPS system; a control method for allowing soft bypass transfers for UPSs with or without output transformer, where in the former case, different winding connections of the output isolation transformer may be used, such as Δ-Y and Δ-Z, for example; a control system for UPSs that may be applied to various UPS topologies, such as where galvanic isolation on the bypass is realized through a multi-input transformer; a control system for UPSs that may be applied to three phase UPSs as well as to low power single phase UPSs; a soft bypass transfer methodology that may be applied to UPSs of any power level, and to parallel UPS systems; a control system for UPSs that may be implemented via digital control or analog control; and, a soft bypass transfer control scheme for UPSs that helps to minimize the energy transfer from the bypass to the DC link of the inverter thereby avoiding a possible dangerous increase of the DC link voltage.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A control system for an uninterruptible power supply (UPS) for servicing a load, the UPS having a bypass feed path operable in parallel with an inverter feed path, the bypass feed path being engagable via a first switch to deliver a bypass current to the load, the inverter feed path having an inverter responsive to a control signal and being engagable via a second switch to deliver an inverter current to the load, the control system comprising:
   a processing circuit; and
   a storage medium, readable by the processing circuit, storing instructions for execution by the processing circuit for:
      generating a paralleling detection signal indicative of the bypass feed path operating to service the load in parallel with the inverter feed path; and
   in response to the presence of the paralleling detection signal, modifying the control signal to the inverter such that the inverter current is driven toward equaling the bypass current, thereby tending to cancel circulation current generated between the bypass feed path and the inverter feed path in response to the two paths operating to service the load in parallel.

2. The control system of claim 1, wherein the storage medium further stores instructions for execution by the processing circuit for, in response to the first switch being off and the second switch being on:
   signaling the first switch to turn on;
   signaling the second switch to turn off simultaneous with or subsequent to the first switch being signaled to turn on;
   in response to the first switch being on, the second switch being signaled to turn off but prior to the second switch being off, generating the paralleling detection signal.

3. The control system of claim 2, wherein the storage medium further stores instructions for execution by the processing circuit for:
   receiving a signal representative of the second switch being off, and turning the paralleling detection signal off in response thereto; and
   in response to the paralleling detection signal being off, disassociating the control signal to the inverter with respect to the modification of the control signal to the inverter driving toward equalization the bypass current and the inverter current.

4. The control system of claim 3, wherein:
   the receiving a signal representative of the second switch being off comprises receiving a signal commanding the second switch to turn off and receiving a signal confirming that the second switch is off.

5. The control system of claim 2, wherein the storage medium further stores instructions for execution by the processing circuit for, in response to the first switch being on and the second switch being off:
   receiving a signal representative of the second switch being on;
      in response to the first switch being on and the second switch being on, generating the paralleling detection signal.

6. The control system of claim 5, wherein the storage medium further stores instructions for execution by the processing circuit for:
   receiving a signal representative of the first switch being turned off;
   in response to the first switch being off and the bypass current being off, turning the paralleling detection signal off in response thereto; and
   in response to the paralleling detection signal being off, disassociating the control signal to the inverter with respect to the modification of the control signal to the inverter driving toward equalization the bypass current and the inverter current.

7. The control system of claim 1, further comprising:
   an inverter output voltage controller responsive to an inverter voltage reference, a current difference between the output of the bypass feed path and the output of the inverter feed path, a bridge current at the inverter, an output voltage at the inverter, and a load current at the inverter, and productive of a control signal for controlling the inverter output voltage.

8. The control system of claim 7, wherein:
   the inverter output voltage controller is responsive to the voltage difference between the output of the bypass feed path and the output of the inverter feed path only in the presence of the paralleling detection signal.

9. The control system of claim 1, further comprising:
   a paralleling detection signal generator responsive to a plurality of input signals and productive of the paralleling detection signal.

10. The control system of claim 9, wherein the plurality of input signals comprises:
    a command signal to the first switch;
    a command signal to the second switch;
    a signal representative of the state of the second switch;
    a signal representative of the state of the bypass current; and
       a signal representative of the state of the inverter load currents.

11. The control system of claim 10, wherein the paralleling detection signal generator is productive of a signal representative of the actual state of the second switch.

12. The control system of claim 11, wherein the signal representative of the actual state of the second switch is representative of the second switch being on in response to the command signal to second switch being on and the state of the second switch being represented as being on.

13. The control system of claim 1, wherein the UPS is configured as a double conversion UPS.

14. The control system of claim 1, wherein the UPS is configured as a redundant parallel architecture (RPA) UPS.

15. A control system for an uninterruptible power supply (UPS) for servicing a load, the UPS having a bypass feed path operable in parallel with an inverter feed path, the bypass feed path being engagable via a first switch to deliver a bypass current to the load, the inverter feed path having an inverter responsive to a control signal and being engagable via a second switch to deliver an inverter current to the load, the control system configured for facilitating:

the generation of a paralleling detection signal indicative of the bypass feed path operating to service the load in parallel with the inverter feed path; and in response to the presence of the paralleling detection signal, the modification of the control signal to the inverter such that the inverter current is driven toward equaling the bypass current, thereby tending to cancel circulation current generated between the bypass feed path and the inverter feed path in response to the two paths operating to service the load in parallel.

16. A computer program product for controlling an uninterruptible power supply (UPS) for servicing a load, the UPS having a bypass feed path operable in parallel with an inverter feed path, the bypass feed path being engagable via a first switch to deliver a bypass current to the load, the inverter feed path having an inverter responsive to a control signal and being engagable via a second switch to deliver an inverter current to the load, the computer program product having machine readable instructions embodied in a tangible medium for:

generating a paralleling detection signal indicative of the bypass feed path operating to service the load in parallel with the inverter feed path; and in response to the presence of the paralleling detection signal, modifying the control signal to the inverter such that the inverter current is driven toward equaling the bypass current, thereby tending to cancel circulation current generated between the bypass feed path and the inverter feed path in response to the two paths operating to service the load in parallel.

17. A method for controlling an uninterruptible power supply (UPS) for servicing a load, the UPS having a bypass feed path operable in parallel with an inverter feed path, the bypass feed path being engagable via a first switch to deliver a bypass current to the load, the inverter feed path having an inverter responsive to a control signal and being engagable via a second switch to deliver an inverter current to the load, the method comprising:

generating a paralleling detection signal indicative of the bypass feed path operating to service the load in parallel with the inverter feed path; and in response to the presence of the paralleling detection signal, modifying the control signal to the inverter such that the inverter current is driven toward equaling the bypass current, thereby tending to cancel circulation current generated between the bypass feed path and the inverter feed path in response to the two paths operating to service the load in parallel.

* * * * *